United States Patent
Kim

(10) Patent No.: US 10,164,564 B2
(45) Date of Patent: Dec. 25, 2018

(54) METHOD AND SYSTEM FOR CONTROLLING WOUND ROTOR SYNCHRONOUS MOTOR

(71) Applicant: HYUNDAI MOTOR COMPANY, Seoul (KR)

(72) Inventor: Kyung Su Kim, Gwangju (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 15/581,894

(22) Filed: Apr. 28, 2017

(65) Prior Publication Data

US 2018/0145624 A1 May 24, 2018

(30) Foreign Application Priority Data

Nov. 22, 2016 (KR) .................. 10-2016-0155418

(51) Int. Cl.
| | | |
|---|---|---|
| *H02P 29/66* | (2016.01) | |
| *H02P 25/024* | (2016.01) | |
| *H02P 21/14* | (2016.01) | |

(52) U.S. Cl.
CPC ............ *H02P 29/666* (2016.11); *H02P 21/14* (2013.01); *H02P 25/024* (2016.02)

(58) Field of Classification Search
CPC ....... H02P 25/024; H02P 21/14; H02P 29/666
USPC ........... 318/720, 634, 400.08, 788, 792, 641
See application file for complete search history.

(56) References Cited

U.S. PATENT DOCUMENTS

| | | | | |
|---|---|---|---|---|
| 6,900,714 B1* | 5/2005 | Huang | .................. | H02H 7/001 |
| | | | | 310/52 |
| 2008/0054835 A1* | 3/2008 | Tamaru | .................. | H02P 25/08 |
| | | | | 318/634 |
| 2012/0139459 A1* | 6/2012 | Lim | .................... | H02P 21/0017 |
| | | | | 318/400.02 |
| 2012/0217915 A1* | 8/2012 | Wu | .......................... | H02P 6/20 |
| | | | | 318/400.07 |
| 2012/0299521 A1* | 11/2012 | Petersson | ............... | H02P 23/14 |
| | | | | 318/490 |

FOREIGN PATENT DOCUMENTS

KR 10-1664680 10/2016

* cited by examiner

*Primary Examiner* — Jorge L Carrasquillo
(74) *Attorney, Agent, or Firm* — Brinks Gilson & Lione

(57) ABSTRACT

The present disclosure provides a system for controlling a wound rotor synchronous motor including: a current/voltage determiner configured to determine optimum rotor current using a map from real-time motor operating information and to determine and output a rotor voltage according to the determined optimum rotor current, and a temperature estimator configured to calculate and output a rotor coil temperature from the rotor voltage and the optimum rotor current output from the current/voltage determiner using a rotor coil temperature estimation equation set from a correlation equation between the rotor voltage and the rotor coil temperature for each rotor current.

12 Claims, 4 Drawing Sheets

METHOD AND SYSTEM FOR CONTROLLING WOUND ROTOR SYNCHRONOUS MOTOR

CROSS-REFERENCE TO RELATED APPLICATION

The present application claims priority to and the benefit of Korean Patent Application No. 10-2016-0155418 filed on Nov. 22, 2016, which is incorporated herein by reference in its entirety.

FIELD

The present disclosure relates to a method and a system for controlling a wound rotor synchronous motor. More particularly, it relates to a method and a system for controlling a wound rotor synchronous motor for estimating a temperature of a rotor coil in real-time according to operating information of a wound rotor synchronous motor.

BACKGROUND

The statements in this section merely provide background information related to the present disclosure and may not constitute the related art.

Recently, efforts to extend an application range of a wound rotor synchronous motor have been made due to the mineralization of rare earth resources and rise of manufacturing costs and supply crunch of rare earth permanent magnet materials.

For example, an interior permanent magnet synchronous motor (IPMSM) has been used as an electric motor (driving motor) as a driving source of an eco-friendly vehicle but research and development to apply a wound rotor synchronous motor (WRSM) having a rotor and a stator with winding coils as a driving source of an eco-friendly vehicle has actively proceeded.

As is well known, a wound rotor synchronous motor is a motor for applying an electric coil instead of a permanent magnet to a rotor and is configured to generate torque according to interaction with a stator by winding a coil around the rotor and applying direct current (DC) to the coil to form an electric field.

As described above, the wound rotor synchronous motor with the rotor being wound by a coil instead of a permanent magnet additionally requires control of rotor current $I_f$ flowing through the rotor coil and, thus, when a conventional control method of a permanent magnet synchronous motor is used, overload of a control central processing unit (CPU) and massive map data due to a combination of a control variable of vector control currents Id and Iq and rotor current $I_f$ may occur In addition, force corresponding to magnetomotive force of a permanent magnet needs to be generated as electromotive force of a rotor through input of DC current in a wound rotor synchronous motor and, thus, heating and temperature rise frequently occur due to copper loss of a rotor coil.

Accordingly, when a wound rotor synchronous motor is applied, a temperature of a rotor wound by a coil increases and, thus, a technology of estimating a rotor temperature is desired.

When logic for preventing temperature rise of a rotor coil and protecting the rotor coil according to a load operating condition is not applied, copper loss of the rotor coil and limit in operating performance may occur.

In particular, excessive heat may be generated in a wound rotor synchronous motor due to loss of a rotor according to a load operating condition. Accordingly, there is a possibility of degradation in motor performance due to reduction in magnetic flux of a rotor and loss in a rotor coil occurs and a possibility of a fire breaking out because a rotor overheats.

According to the related art, a logic for preventing temperature rise of a rotor coil and protecting the rotor coil based on an actually measured temperature of the rotor coil for each operating condition is configured by storing actually measured values for each current according to an operating condition/stator in the form of a database to configure a rotor coil current control map and then inducing optimum rotor current of an existing input variable from the rotor coil current control map.

However, an exaggerated rotor coil current control map due to an excessive combination of control variables of vector control currents Id and Iq, rotor current $I_f$, and so on and reduction in processing velocity due to overload of a control CPU may be caused.

In addition, an excessive amount of data and excessive time taken to store coil temperature of a coil for each rotor current in the form of a database in order to inhibit loss in a rotor coil may be caused.

Accordingly, although a technology for estimating a temperature of a rotor coil according to a rotor temperature table based on an interpreted value has been known, it is not possible to accurately measure the temperature of the rotor coil according to a real-time operating condition.

As a result, reduction in control performance of a wound rotor synchronous motor due to a deviation in temperature measurement may be caused. Also, design criteria for protection of a rotor from overheating may not be accurate, and additional expenses for storing data may be incurred.

It is difficult to accurately estimate a temperature of a rotor coil and, thus, there are severe problems in terms of reduction in performance of a wound rotor synchronous motor due to loss in resistance and a fire risk due to loss in a rotor coil.

SUMMARY

In one aspect, the present disclosure provides a method and a system for controlling a wound rotor synchronous motor, for accurately estimating a temperature of a rotor coil in real-time according to operating information of a wound rotor synchronous motor to enhance control performance of a motor and effectively preventing overheating/loss of the rotor coil.

In one form of the present disclosure, a system for controlling a wound rotor synchronous motor includes a current/voltage determiner configured to determine optimum rotor current using a map from real-time motor operating information and to determine and output a rotor voltage according to the determined optimum rotor current, and a temperature estimator configured to calculate and output a rotor coil temperature from the rotor voltage and the optimum rotor current output from the current/voltage determiner using a rotor coil temperature estimation equation set from a correlation equation between the rotor voltage and the rotor coil temperature for each rotor current.

The system may further include a determiner configured to compare the rotor coil temperature output from the temperature estimator and a preset rotor protection temperature set value to determine whether logic for protecting a rotor coil is performed, and a rotor command determiner configured to finally determine a rotor current command for controlling current applied to the rotor coil according to a result of the determination of the determiner.

In another form of the present disclosure, a method of controlling a wound rotor synchronous motor includes determining optimum rotor current using a map from real-time motor operating information and determining a rotor voltage according to the determined optimum rotor current, and calculating a rotor coil temperature from the rotor voltage and the determined optimum rotor current using a rotor coil temperature estimation equation set from a correlation equation between the rotor voltage and the rotor coil temperature for each rotor current.

The method may further include comparing the determined rotor coil temperature and a preset rotor protection temperature set value to determine whether logic for protecting a rotor coil is performed, and finally determining a rotor current command for controlling current applied to the rotor coil according to a result of the determination.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
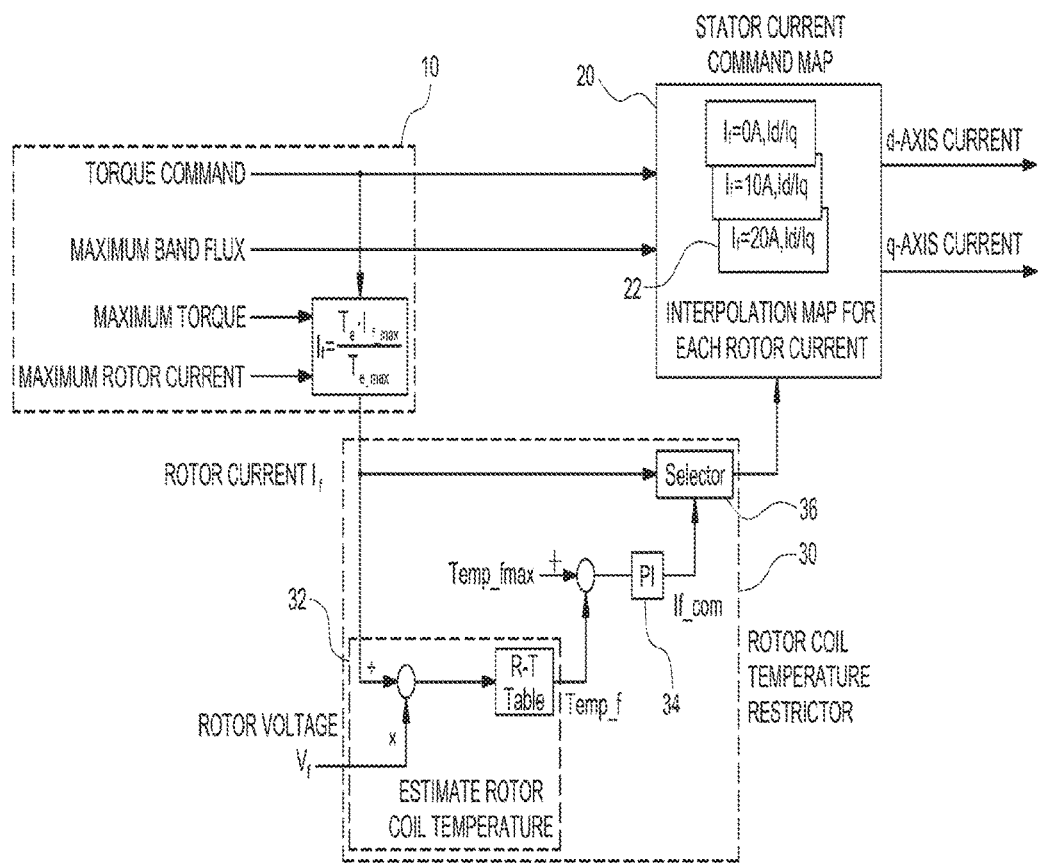
FIG. 1 is a diagram illustrating a structure for controlling a wound rotor synchronous motor according to the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a method and system for controlling a wound rotor synchronous motor, for accurately estimating a temperature of a rotor coil in real-time according to operating information of a wound rotor synchronous motor to enhance control performance of a motor and effectively preventing overheating/loss of the rotor coil.

Before the description of one form of the present disclosure, Korean Patent No. 10-1664680 (Oct. 4, 2016) (Patent Document 1) filed and registered by the present applicant discloses a system for controlling a wound rotor synchronous motor for controlling rotor current according to an operating command to enhance control performance of a wound rotor synchronous driving motor and preventing loss in the rotor coil by restricting rotor current in real time according to an operating condition to prevent excessive temperature rise.

In more detail, FIG. 1 is a diagram illustrating a structure of the system for controlling the wound rotor synchronous motor disclosed in Patent Document 1.

First, the system for controlling a wound rotor synchronous motor disclosed in Patent Document 1 may include a rotor current command generator 10 for generating a rotor current command $I_f$ based on a torque command $T_e$, maximum torque $T_{e\_max}$, and maximum rotor current $I_{f\_max}$ of a driving motor, and a stator current command map 20 for determining a stator current command based on the torque command $T_e$ and maximum band flux $\lambda^{-1}$ of the driving motor.

Here, the rotor current command generator 10 may be configured to determine the rotor current command $I_f$ according to Equation 1, $$I_f = \frac{T_e \cdot I_{f\_max}}{T_{e\_max}}.$$

In this case, the stator current command map 20 may be configured to include a map for each of a plurality of rotor currents with a criteria rotor current value set therefor and configured to select one of the plurality of maps based on the rotor current command $I_f$ output from the rotor current command generator 10 and to determine a stator current command (d-axis current and q-axis current) through the selected map.

The system may include a rotor coil temperature restrictor 30 for receiving the rotor current command $I_f$ determined by the rotor current command generator 10, determining a final rotor current command based on the input rotor current command $I_f$, and outputting the final rotor current command to the stator current command map 20.

In this case, the stator current command map 20 may be configured to select a map based on the final rotor current command output from the rotor coil temperature restrictor 30 and to determine a stator current command through the selected map.

The rotor coil temperature restrictor 30 may include a PI controller 34 for calculating maximum rotor current If_com for temperature restriction such that a rotor coil temperature Temp_f does not exceed a preset rotor coil maximum setting temperature Temp_fmax,_f, and a selector 36 for selecting one of the rotor current command $I_f$ and the maximum rotor current If_com for temperature restriction based on a comparison result between the rotor coil temperature Temp_f and the rotor coil maximum setting temperature Temp_fmax and outputting the selected one to the stator current command map 20 as a final rotor current command.

The rotor coil temperature restrictor 30 may further include a rotor temperature estimator 32 for calculating a real-time rotor coil temperature Temp_f based on a rotor voltage $V_f$ that is acquired in real-time and a rotor current command $I_f$ output from the rotor current command generator 10.

From the aforementioned configuration, a stator current command may be determined from a stator current command map using the torque command $T_e$ and the maximum band flux $\lambda^{-1}$ as input and rotor current command $I_f$ may be determined according to Equation 1 above.

The rotor temperature estimator 32 may estimate the rotor coil temperature Temp_f using an interpreted value-based rotor-temperature estimation table (R-T Table) from the rotor current command $I_f$ output from the rotor current command generator 10.

However, rotor heating occurs in a wound rotor synchronous motor due to temperature rise of a rotor for each operating time according to a real-time motor operating condition and, as a result, in the above system, there is large error between an actual temperature and the rotor coil temperature Temp_f estimated using the interpreted value-based rotor-temperature estimation table (R-T Table).

Accordingly, rotor controllability is degraded and it is difficult to accurately establish rotor temperature specification criteria.

Temperature restriction logic (i.e., rotor protection logic) may not be operated due to errors in terms of estimation of rotor temperature and, accordingly, the possibility that loss in a rotor coil occurs and fire breaks out due to high temperature may be increased.

In addition, high expenses for storing and managing data due to an excessive amount of data of the rotor-temperature estimation table (R-T Table) should be considered.

Accordingly, the present disclosure provides a system and method of controlling a wound rotor synchronous motor, which contains an enhanced method of estimating a temperature of a rotor coil.

The present disclosure proposes a method of estimating a temperature of a rotor coil using a thermal model established via analysis of a correlation between the rotor voltage $V_f$ and the rotor coil temperature Temp_f for each rotor current $I_f$.

The present disclosure proposes a method of generating a rotor current command for preventing overheating/loss of the rotor by estimating a temperature of a rotor coil of a wound rotor synchronous motor according to a real-time operating condition.

Figure 2:
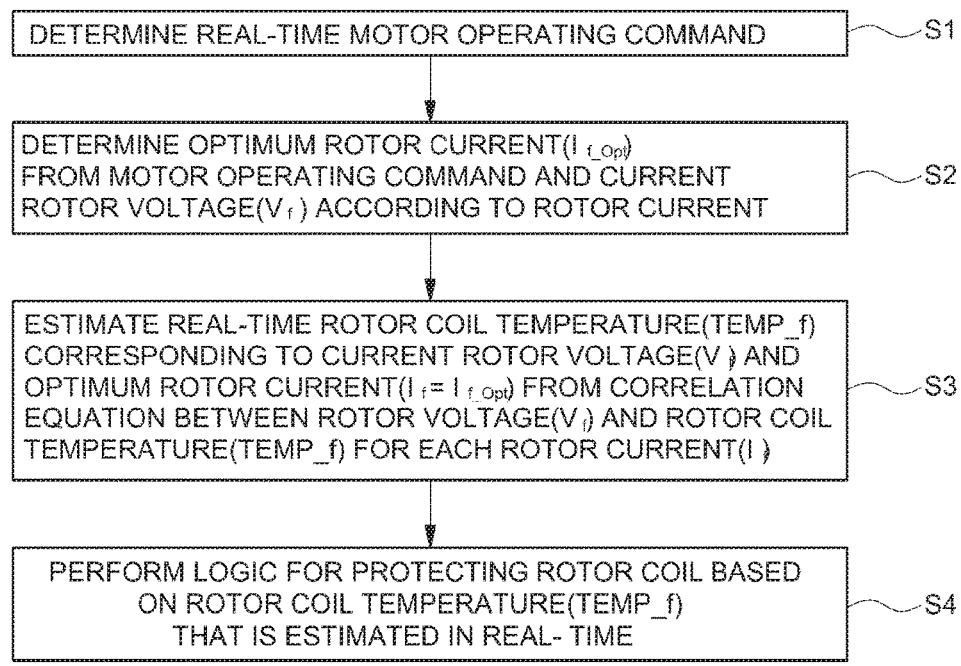
FIG. 2 is a diagram illustrating an overall procedure of a method of controlling a wound rotor synchronous motor.

FIG. 2 is a diagram illustrating an overall procedure of a method of controlling a wound rotor synchronous motor according to the present disclosure. Referring to FIG. 2, when an operating command (torque and velocity) for motor operating information, i.e., motor control, is determined in real-time (S1), optimum rotor current $I_{f\_opt}$ may be determined from the operating command and, simultaneously, current rotor voltage $V_f$ according to rotor current may be determined (S2).

The rotor voltage $V_f$ may be determined by change in a rotor resistance value based on temperature rise and the optimum rotor current $I_{f\_Opt}$ and, more particularly, may be determined as a value obtained by multiplying the change in a rotor resistance value and optimum rotor current.

Here, data such as the rotor resistance value may be an experimental value obtained via antecedent testing and evaluation procedures and the experimental value may be stored and used.

Then, the rotor coil temperature Temp_f corresponding to current rotor voltage $V_f$ and the optimum rotor current $I_f=I_{f\_Opt}$ may be estimated and determined in real-time using the correlation between the rotor voltage $V_f$ and the rotor coil temperature Temp_f for each rotor current $I_f$ (S3).

Then, control logic for protecting the rotor coil may be performed based on the rotor coil temperature Temp_f that is estimated in real-time (S4).

When the wound rotor synchronous motor is operated, in reality, there is a deviation between an estimated value and an actual measurement value with respect to a temperature of the rotor coil according to an operating condition and, accordingly, errors in a current map command and loss in the rotor coil due to the deviation may be caused.

Accordingly, a correlation between rotor loss based on an actual measurement value and a temperature of a rotor coil may be analyzed to establish a thermal model for estimating a rotor temperature in real time and, then, rotor current needs to be controlled in an operating region for preventing rotor loss through the established thermal model.

Figure 3:
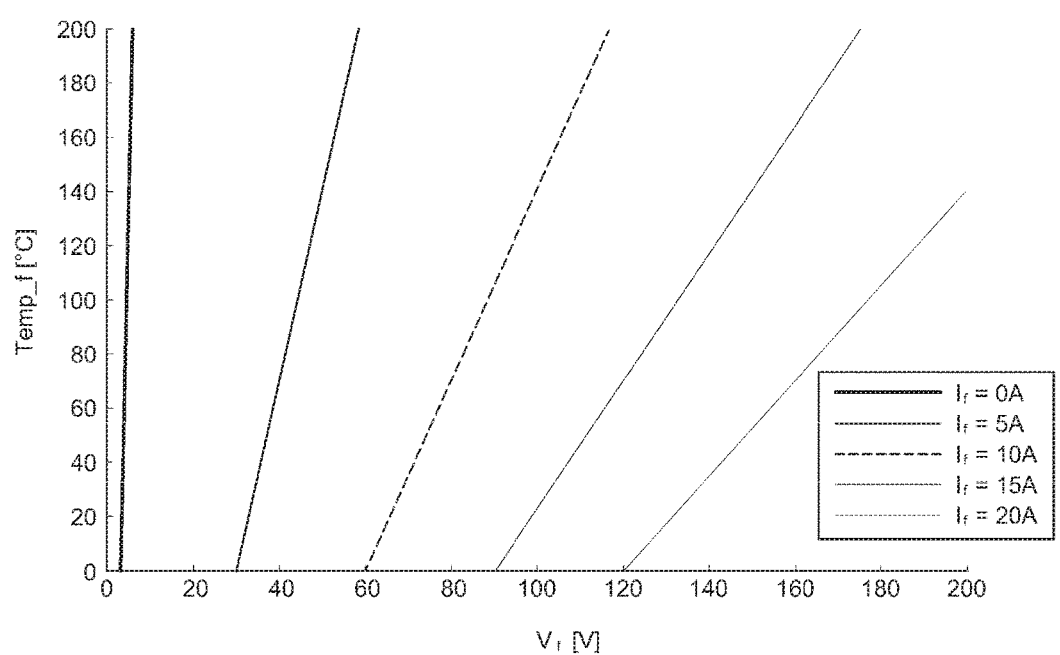
FIG. 3 is a diagram illustrating an example of a correlation between a rotor voltage $V_f$ and a rotor coil temperature Temp_f for each rotor current $I_f$.

In some forms of the present disclosure, as shown in FIG. 3, through the antecedent testing and evaluation procedures, the correlation between the rotor voltage $V_f$ and rotor coil temperature Temp_f for each rotor current $I_f$ may be analyzed, an estimation equation of a temperature of a rotor coil may be obtained from the analysis result and, then, a thermal module based on the estimation equation may be established.

That is, as shown in FIG. 3, in order to induce the estimation equation of a temperature of a rotor coil, an actual measurement value and change value of the temperature of the rotor coil according to rotor voltage $V_f$ for each rotor current (e.g., $I_f$=0, 5, 10, 15, 20 A, ...) may be acquired via a principle test, and the estimation equation of the correlation between the acquired rotor voltage $V_f$ and the rotor coil temperature Temp_f may be obtained.

For example, the estimation equation of a temperature of a rotor coil may be acquired using the data of FIG. 3 obtained via the antecedent testing and evaluation procedures.

$$\text{Temp}\_f = A \times V_f + B \qquad \text{[Equation 2]}$$

Here, Temp_f is rotor coil temperature, $V_f$ is rotor voltage, A is a proportional coefficient of a temperature of a rotor coil, and B is a proportional constant of a temperature of a rotor coil.

The coefficient A and the constant B may be pre-acquired for each rotor current (e.g., 0, 5, 10, 15, 20 A, ...) in the antecedent testing and evaluation procedures, may be established in the form of a database for each rotor current and, then, coefficients and constants for each rotor current stored in a database may be previously set, input, stored, and used in a control system (a temperature estimator to be described later).

With respect to the rotor current $I_f$ except for a current value with the rotor coil temperature Temp_f being defined for the rotor voltage $V_f$, that is, a current value (0, 5, 10, 15, 20 A, ...) with the coefficient and constant being preset through the correlation Equation 2 above, a temperature of a rotor coil with respect to change in rotor voltage may be estimated via interpolation from the correlation between the rotor voltage and the rotor coil temperature.

Figure 4:
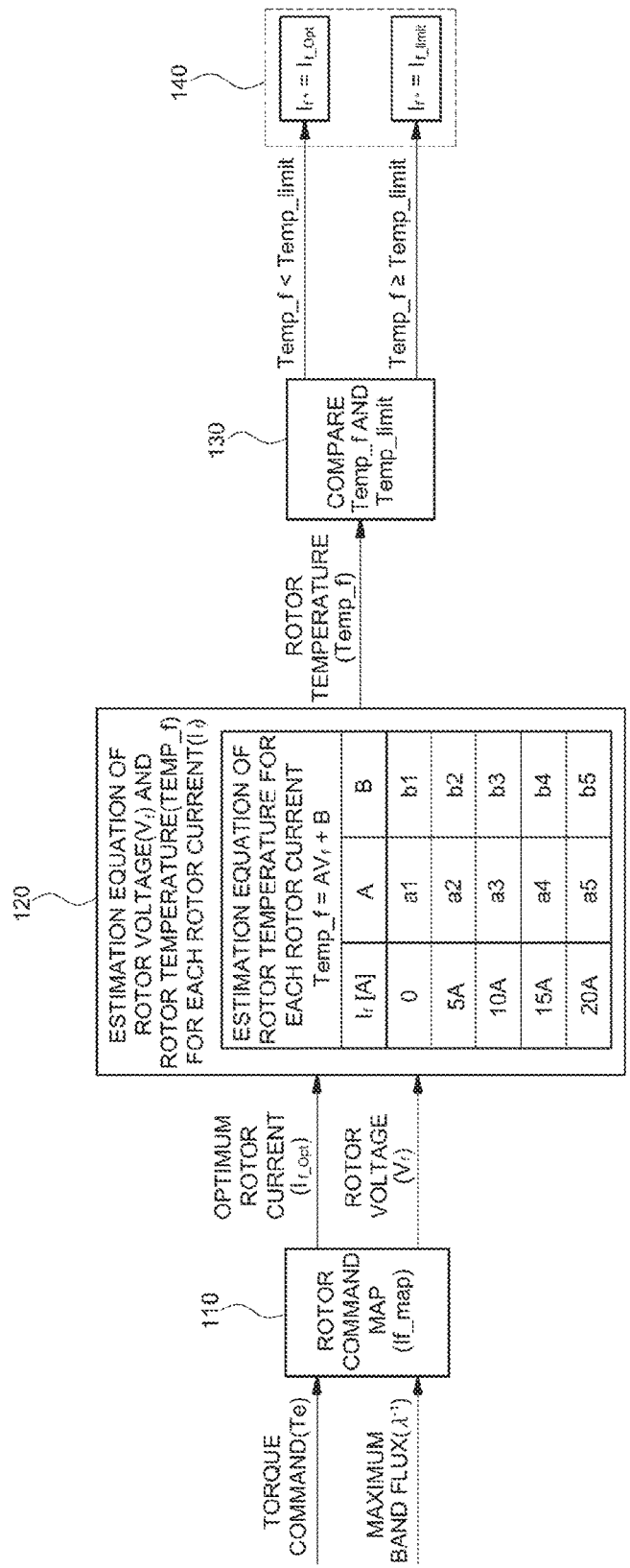
FIG. 4 is a block diagram illustrating a structure of a system for controlling a wound rotor synchronous motor.

FIG. 4 is a block diagram illustrating a structure of a system for controlling a wound rotor synchronous motor according to one form of the present disclosure. The block diagram includes a configuration for estimating the rotor coil temperature Temp_f in real time from real-time motor operating information, and a configuration for lastly determining a current command, i.e., rotor current command $I_{f^*}$ for controlling current applied to a rotor coil in order to protect the rotor coil from overheating/loss of the rotor coil based on the rotor coil temperature Temp_f that is estimated in real time.

That is, the system for controlling the wound rotor synchronous motor according to one form of the present disclosure may include a current/voltage determiner 110 for determining the optimum rotor current $I_{f\_Opt}$ using a rotor command map If_map from the real-time motor operating information and determining and outputting the current rotor voltage $V_f$ according to the determined optimum rotor current $I_{f\_Opt}$ in real time, a temperature estimator 120 for estimating and outputting the rotor coil temperature Temp_f from the current rotor voltage $V_f$ and the optimum rotor current $I_{f\_Opt}$ output from the current/voltage determiner 110 using the preset rotor coil temperature estimation equation, a determiner 130 for comparing a preset rotor protection temperature set value Temp_limit and the rotor coil temperature Temp_f output from the temperature estimator 120 to determine whether the logic for protecting the rotor coil is performed, and a rotor command determiner 140 for finally determining the rotor current command $I_{f*}$ according to the determination result of the determiner 130.

Here, the motor operating information may be information corresponding to a real-time motor operating condition, i.e., information on the motor torque command $T_e$ and motor velocity, and the rotor coil temperature Temp_f according to the information may be estimated using the real-time operating condition of the wound rotor synchronous motor in real time.

The information on the motor velocity may be the maximum band flux $\lambda^{-1}$ of the motor.

In this case, the rotor command map If_map of the current/voltage determiner 110 may be a map, in which the value of the optimum rotor current $I_{f\_Opt}$ is set to a value according to the motor torque command $T_e$ and the maximum band flux $\lambda^{-1}$ and the current/voltage determiner 110 may simultaneously obtain the value of rotor voltage $V_f$ according to the optimum rotor current $I_{f\_Opt}$ that is determined from the rotor command map If_map.

The rotor coil temperature estimation equation of the temperature estimator 120 may be a correlation equation between the rotor voltage $V_f$ and the rotor coil temperature Temp_f for each rotor current $I_f$ shown in Equation 2 above and, in this case, the coefficient A and the constant B of Equation 2 may be preset, input, and stored for each rotor current in the temperature estimator 120.

When Equation 2 above is used, the optimum rotor current $I_{f\_Opt}$ that is determined by the current/voltage determiner 110 and input to the temperature estimator 120 may be real-time rotor current $I_f$ according to the current operating information and operating condition, and the temperature estimator 120 may determine a correlation equation (rotor coil temperature estimation equation) having the coefficient A and the constant B which are determined according to the optimum rotor current $I_f = I_{f\_Opt}$ and determine and estimate the rotor coil temperature Temp_f from the correlation equation.

With reference to the optimum rotor current value except for the current value with the coefficient A and the constant B being determined, the rotor coil temperature Temp_f may be acquired via interpolation in the correlation equation between the rotor voltage $V_f$ and the rotor coil temperature Temp_f for each rotor current $I_f$ using the optimum rotor current $I_{f\_Opt}$ and the rotor voltage $V_f$.

Then, as described above, when the temperature estimator 120 acquires and outputs the rotor coil temperature Temp_f, the determiner 130 may compare the input rotor coil temperature Temp_f with the preset rotor protection temperature set value Temp_limit.

Here, when the rotor coil temperature Temp_f is lower than the rotor protection temperature set value Temp_limit (Temp_f<Temp_limit), the determiner 130 may determine that the rotor coil protection logic needs to be performed.

In this case, the rotor command determiner 140 may receive the determination result of the determiner 130 and determine the rotor current command $I_{f*}$ for controlling current applied to the rotor coil as the optimum rotor current $I_{f\_Opt}$ such that a separate rotor coil protection logic is not performed and current applied to the rotor coil is not limited.

On the other hand, when rotor coil temperature Temp_f is equal to or greater than the rotor protection temperature set value Temp_limit (Temp_f≥Temp_limit), the determiner 130 may determine that the rotor coil protection logic for limiting the current applied to the rotor coil needs to be performed.

In this case, the rotor command determiner 140 may receive the determination result of the determiner 130, determine the rotor current command $I_{f*}$ as a preset rotor protecting limit current value $I_{f\_limit}$ and, thus, limit the current applied to the rotor coil as the rotor protecting limit current value $I_{f\_limit}$.

The rotor coil protection logic may be logic for limiting the current applied to the rotor coil to inhibit overheating of a rotor coil and loss in the rotor coil and may limit the current of the rotor coil to inhibit excessive temperature rise of the rotor coil.

The rotor protection temperature set value Temp_limit may be a preset value obtained via antecedent testing and evaluation procedures and may be a temperature value that is pre-input and used by the determiner 130, and when a temperature of the rotor coil reaches the temperature, the rotor protection temperature set value Temp_limit may be preset in consideration of a temperature condition in which there is a possibility of an excessive temperature rise of a rotor coil and loss in the rotor coil arises.

The rotor protecting limit current value $I_{f\_limit}$ is also a value preset via antecedent testing and evaluation procedures and is a current valued that is pre-input to the rotor command determiner 140, and when current applied to the rotor coil as a current value is limited, the rotor protecting limit current value $I_{f\_limit}$ may be preset in consideration of a rotor current value for definitely preventing excessive temperature rise of the rotor coil and loss in the rotor coil.

Accordingly, in some forms of the present disclosure, a method and system for controlling a wound rotor synchronous motor may accurately estimate a temperature of a rotor coil according to motor operating information in real time during load operating of a wound rotor synchronous motor to enhance motor control performance and to effectively prevent overheating/loss in the rotor coil, fire, and so on.

A temperature of a rotor coil may be accurately estimated in real time to enhance control accuracy of the motor system, to reduce a deviation of motor output according to enhancement in control accuracy, to enhance system efficiency, and to improve fuel efficiency of a vehicle.

In addition, expenses for replacing components and motors due to loss in a rotor may be reduced, fire may be prevented to enhance vehicle safety, and accuracy of criteria for protecting an internal voltage of a rotor according to estimation of real-time rotor coil may be enhanced.

In the method of estimating a rotor coil temperature proposed according to one form of the present disclosure, an internal temperature of a rotor may be estimated through development and application of a thermal model of the rotor coil and manufacturing costs may be reduced by omitting a rotor temperature sensor.

A map may be enhanced compared with the related art and, for example, use of a temperature estimation map that requires an excessive amount of data may be reduced, a storage device for storing massive data may be omitted and reduced and, accordingly, manufacturing costs may be reduced.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for controlling a wound rotor synchronous motor, comprising:
a current/voltage determiner configured to determine an optimum rotor current using a map from real-time motor operating information, and configured to determine and output a rotor voltage based on the optimum rotor current; and
a temperature estimator configured to calculate and output a rotor coil temperature from the rotor voltage and the optimum rotor current output from the current/voltage determiner based on a rotor coil temperature estimation equation, wherein the rotor coil temperature estimation equation is a correlation equation, for each of a plurality of a rotor current, between the rotor voltage and the rotor coil temperature;
a determiner configured to determine whether a logic for protecting a rotor coil is in an on-state or an off-state, wherein the logic for protecting the rotor coil is based on a comparison of the rotor coil temperature with a preset rotor protection temperature value; and a rotor command determiner configured to determine a rotor current command based on a result of the determiner, wherein the rotor current command controls current applied to the rotor coil;
wherein the temperature estimator sets the rotor coil temperature estimation equation as:

$$\text{Temp } f = A \times V_f + B,$$

wherein Temp f is the rotor coil temperature, Vf is the rotor voltage, and A and B are a coefficient and a constant that are preset for each rotor current of the plurality of the rotor current, and wherein A and B are determined based on the optimum rotor current.

2. The system of claim 1, wherein, when the rotor coil temperature is lower than the preset rotor protection temperature value, the determiner is configured to determine that the logic for protecting the rotor coil is in the off-state.

3. The system of claim 2, wherein, when the determiner determines that the logic for protecting the rotor coil is in the off-state, the rotor command determiner is configured to determine the rotor current command as the optimum rotor current.

4. The system of claim 1, when the rotor coil temperature is equal to or greater than the preset rotor protection temperature value, the determiner is configured to determine that the logic for protecting the rotor coil is the on-state.

5. The system of claim 4, wherein, when the determiner determines that the logic for protecting the rotor coil is in the on-state, the rotor command determiner is configured to determine the rotor current command as a preset rotor protection restriction current value and, wherein the rotor command determiner is configured to restrict current applied to the rotor coil to the rotor protection restriction current value.

6. The system of claim 1, wherein, when the optimum rotor current is not a preset rotor current with a preset coefficient and constant, the temperature estimator is configured to determine the rotor coil temperature corresponding to the optimum rotor current via interpolation based on the rotor coil temperature estimation equation.

7. A method of controlling a wound rotor synchronous motor, comprising:
determining an optimum rotor current using a map from real-time motor operating information and determining a rotor voltage based on the optimum rotor current; and
calculating a rotor coil temperature from the rotor voltage and the optimum rotor current based on a rotor coil temperature estimation equation, wherein the rotor coil temperature estimation equation is a correlation equation, for each of plurality of a rotor current, between the rotor voltage and the rotor coil temperature;
determining whether a logic for protecting a rotor coil is an on-state or an off-state, wherein the logic for protecting the rotor coil is determined based on a comparison of the rotor coil temperature with a preset rotor protection temperature value; and determining a rotor current command, wherein the rotor current command controls current applied to the rotor coil;
wherein the rotor coil temperature estimation equation is set as:

$$\text{Temp } f = A \times V_f + B,$$

wherein Temp f is the rotor coil temperature, V is the rotor voltage, and A and B are a coefficient and a constant that are preset for each of the plurality of the rotor current, and wherein A and B are determined based on the optimum rotor current.

8. The method of claim 7, wherein, when the rotor coil temperature is lower than the preset rotor protection temperature value, determining the logic for protecting the rotor coil is the off-state.

9. The method of claim 8, wherein, when the logic for protecting the rotor coil is the off-state, the rotor current command is determined as the optimum rotor current.

10. The method of claim 7, wherein, when the rotor coil temperature is equal to or greater than the preset rotor protection temperature value, determining the logic for protecting the rotor coil is in the on-state.

11. The method of claim 10, wherein, when the logic for protecting the rotor coil is in the on-state, determining the rotor current command as a preset rotor protection restriction current value and, restricting current applied to the rotor coil to the rotor protection restriction current value.

12. The method of claim 7, wherein, when the optimum rotor current is not preset rotor current with preset coefficient and constant, determining a rotor coil temperature corresponding to the optimum rotor current via interpolation based on the rotor coil temperature estimation equation.

* * * * *